US008825778B2

(12) United States Patent
DeLuca et al.

(10) Patent No.: US 8,825,778 B2
(45) Date of Patent: Sep. 2, 2014

(54) SELECTIVE DISPLAY OF PAST INSTANT MESSAGES

(75) Inventors: Lisa Seacat DeLuca, San Francisco, CA (US); Albert DeLucca, Wantagh, NY (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 13/352,519

(22) Filed: Jan. 18, 2012

(65) Prior Publication Data

US 2013/0185363 A1     Jul. 18, 2013

(51) Int. Cl.
*G06F 15/16* (2006.01)

(52) U.S. Cl.
USPC ............................................ 709/206; 709/204

(58) Field of Classification Search
USPC .................................................. 709/204–206
See application file for complete search history.

(56) References Cited

U.S. PATENT DOCUMENTS

| 7,765,267 | B2 | 7/2010 | Ryan et al. |
| 7,912,903 | B2 | 3/2011 | Shah |
| 2005/0080848 | A1 | 4/2005 | Shah |
| 2008/0080679 | A1* | 4/2008 | Fernandez et al. ......... 379/88.17 |
| 2008/0109406 | A1* | 5/2008 | Krishnasamy et al. ........... 707/3 |
| 2008/0147818 | A1* | 6/2008 | Sabo ............................. 709/206 |
| 2009/0083389 | A1 | 3/2009 | Kirkland et al. |
| 2009/0319623 | A1* | 12/2009 | Srinivasan et al. ............ 709/206 |
| 2010/0005402 | A1 | 1/2010 | George et al. |
| 2010/0241749 | A1 | 9/2010 | Rasmussen et al. |
| 2010/0306676 | A1 | 12/2010 | Srinivasaraghavan et al. |
| 2012/0271957 | A1* | 10/2012 | Carney et al. ................. 709/228 |

* cited by examiner

*Primary Examiner* — Joshua Joo
(74) *Attorney, Agent, or Firm* — Cahn & Samuels, LLP

(57) ABSTRACT

A method for allowing selective display of past instant messages includes establishing an instant messaging session among at least two participants. Each participant has an associated computer system, with all of the associated computing systems in communication across a network. A list of instant messages between the at least two participants is displayed on monitors associated with the computing systems. At least one instant message is selected from the list of instant messages using an access control. At least one new participant is invited to join the instant messaging session. When the selected at least one instant message corresponds to the at least one new participant, the selected at least one instant message is displayed on a monitor used by the at least one new participant.

22 Claims, 8 Drawing Sheets

SELECTIVE DISPLAY OF PAST INSTANT MESSAGES

BACKGROUND

The present invention relates to a system, methods, and computer program product for an instant messaging or chat session. In particular, the present invention allows for the selective display of past instant messages.

Instant messaging is an online chat medium that allows users to communicate with each other and to collaborate in real-time over a network data processing system. Instant messaging is commonly used over the Internet. Instant messaging applications monitor and report the status of users that have established each other as online contacts. This information is typically presented to a user in a window of a graphical user interface. Instant messaging applications also are often used in conducting business. By utilizing instant messaging, business users can view each other's availability and initiate a conversation with colleagues or customers when a desired contact becomes available. With instant messaging becoming an important part of both personal and business communications, enhancements are important to the continued success of this type of communication tool.

There are situations in which a new user joins an instant messaging session or group chat after it has already started or after other participants join the session. This causes other users or participants in the instant messaging session to either repeat the text of a previously-displayed instant message or to allow the new user to see the complete session or chat history. However, there are times when at least some of the text in the instant messaging session or chat history might not be something that one or more participants want to share with a new user.

For example, User A, User B, and User C may brainstorm ideas for an extended time in an instant messaging session or group chat. Based upon the discussion, it appears that User D would be a good person to talk with. Currently, Users A-C must start a new instant messaging session, such as a sub-session or thread, so that User D does not actually see the text regarding their discussed ideas.

There remains a need that allows users in an existing instant messaging session to select or mark any part of an instant messaging session as public or private, thereby allowing or preventing the selected or marked part from being displayed to a new user who joins the instant messaging or chat conversation at a later time.

BRIEF SUMMARY

According to one or more embodiments of the invention, a method for allowing selective display of past instant messages includes establishing an instant messaging session among at least two participants, each participant having an associated computer system, and the associated computing systems in communication across a network. A list of instant messages between the at least two participants is displayed on monitors associated with the computing systems. At least one instant message is selected from said list of instant messages using an access control. At least one new participant is invited to join the instant messaging session. When the selected at least one instant message corresponds to the at least one new participant, the selected at least one instant message is displayed on a monitor used by the at least one new participant.

According to one or more embodiments of the invention, a method for allowing selective display of past instant messages includes establishing an instant messaging session among a plurality of participants, each participant having an associated computer system, and the associated computing systems in communication across a network. A list of instant messages between the plurality of participants is displayed on monitors associated with the computing systems. At least one instant message is indentified with a tag. At least one new participant is invited to join the instant messaging session. When the tagged at least one instant message corresponds to the at least one new participant, the tagged at least one instant message is displayed on a monitor used by the at least one new participant.

According to another embodiment of the invention, a system for allowing selective display of past instant messages includes a server for establishing an instant messaging session among a plurality of participants, each participant having an associated computer system, all of the associated computing systems in communication across a network. At least one client includes a graphical user interface for displaying a list of instant messages between the plurality of participants. An access control allows at least one participant to select specific instant messages from the list to be shared with at least one new participant in the instant messaging session.

According to another embodiment of the invention, a computer program product for allowing selective display of past instant messages includes a computer readable storage medium. First program instructions establish an instant messaging session among a plurality of participants, each participant having an associated computer system, all of the associated computing systems in communication across a network. Second program instructions display a list of instant messages between the plurality of participants on monitors associated with the comprising systems. Third program instructions select at least one instant message from said list of instant messages using an access control. Fourth program instructions invite at least one new participant to join the instant messaging session. Fifth program instructions display the selected at least one instant message on a monitor used by at least one new participant, when the selected at least one instant message corresponds to the at least one new participant. The first, second, third, fourth, and fifth program instructions are stored on the computer readable storage medium.

BRIEF DESCRIPTION OF SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used.

Figure 1:
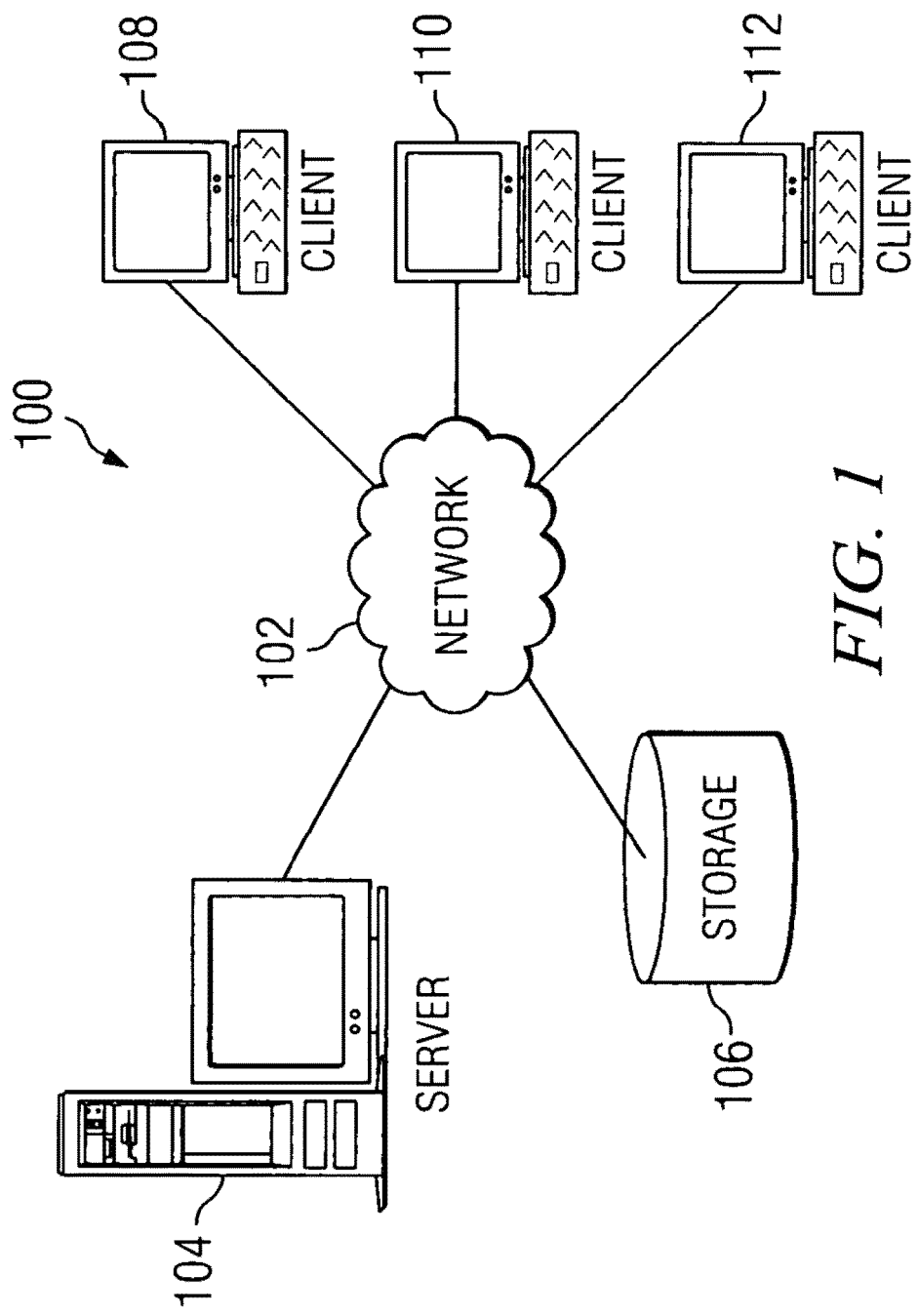
FIG. 1 illustrates a representation of a network of data processing system in which the present invention may be implemented.

With reference now to the figures, FIG. 1 depicts a pictorial representation of a network of data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. Clients 108, 110, and 112 are connected to network 102. These clients 108, 110, and 112 may be, for example, personal computers or network computers or personal digital assistants (PDAs). In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
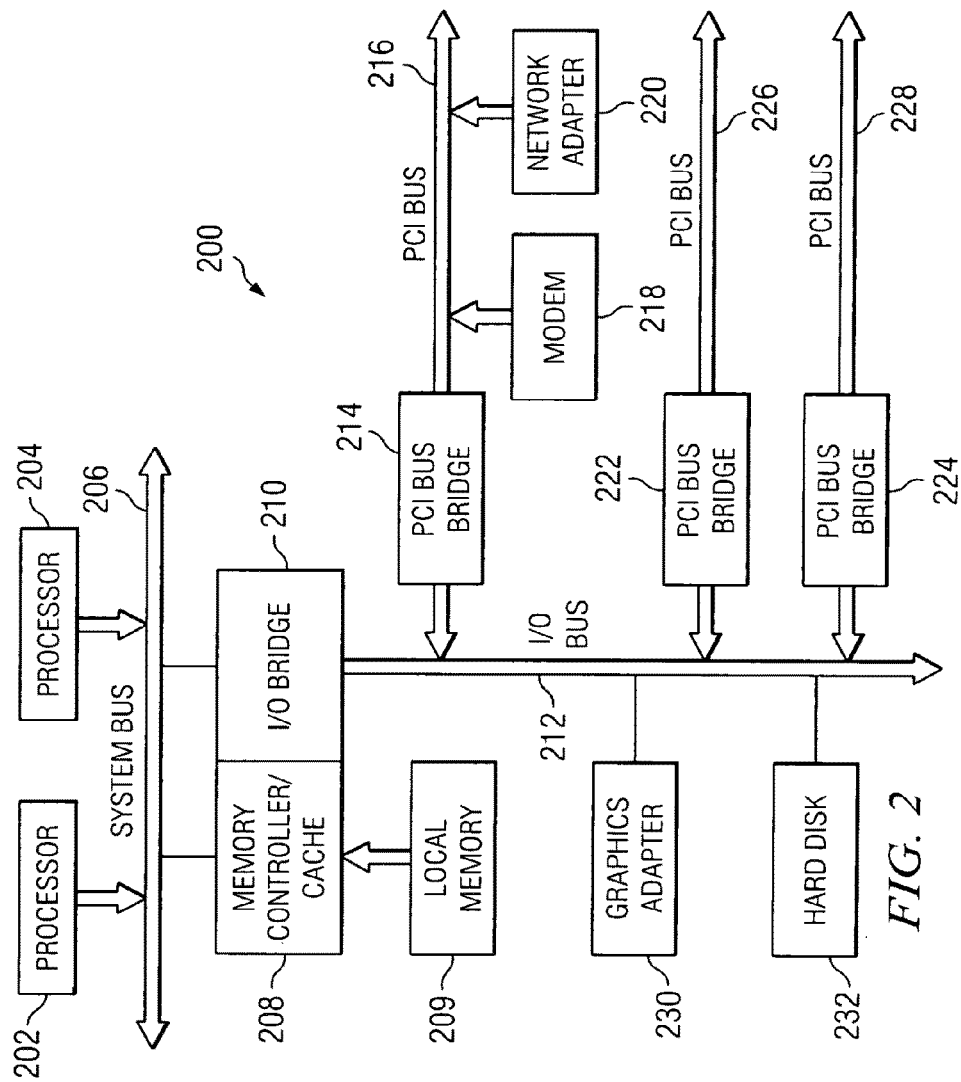
FIG. 2 is a block diagram of a data processing system that may be implemented as a server in accordance with an embodiment of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
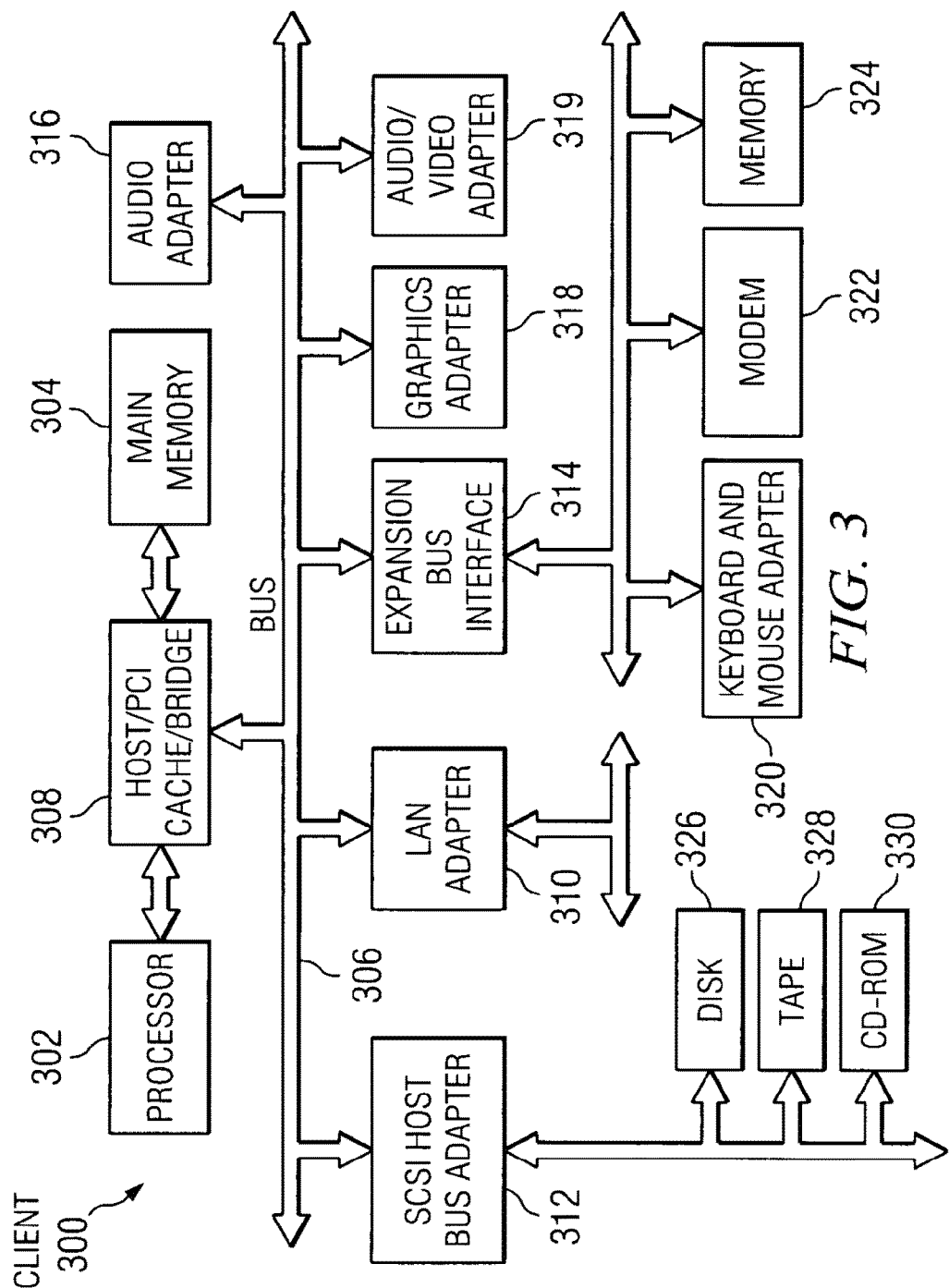
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. JAVA is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
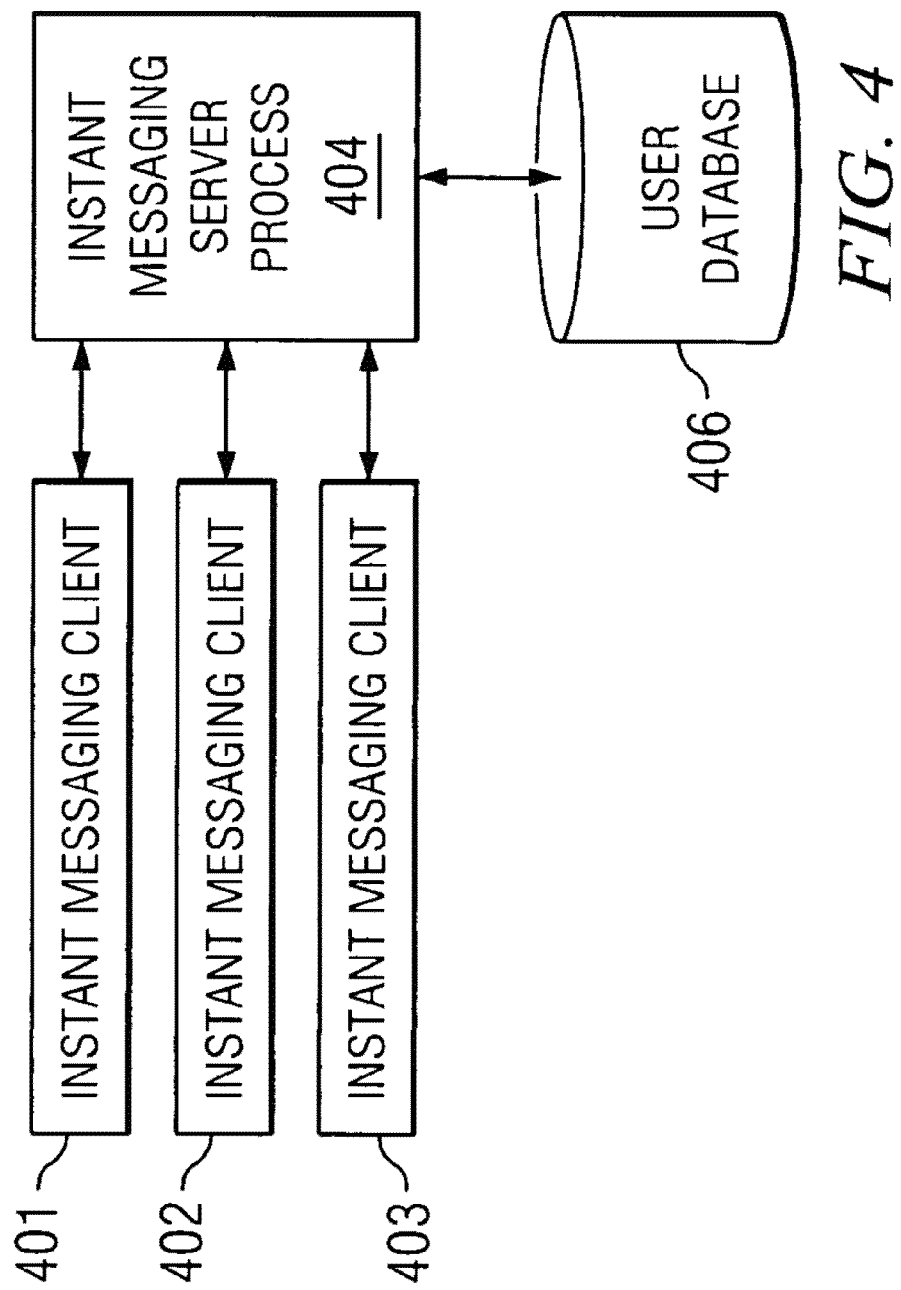
FIG. 4 is a block diagram illustrating components used in managing instant messages in accordance with an embodiment of the present invention.

With reference to FIG. 4, a block diagram illustrating components used in an instant messaging system in accordance with an embodiment of the present invention is shown. In this illustrative example, a user at instant messaging client 401 may send or exchange messages with other users at instant messaging clients 402 and 403. These instant messaging clients may be executing on a data processing system, such as data processing system 300 in FIG. 3. The exchange of messages in these examples is facilitated through instant messaging server process 404. This process allows for users to find other users within the instant messaging system as well as aid in the exchange of messages between different users.

Depending on the particular instant messaging system, instant messaging server process 404 may only be involved in providing an indication of when particular users are online and for establishing initial contacts while users contacting users already on a buddy list may contact those users directly after seeing that a particular user is online. Instant messaging server process 404 may be located on a server, such as data processing system 200 in FIG. 2.

In these examples, the different users registered to the instant messaging system may be stored in user database 406. This user database provides information needed to search for and find other users as well as contact users when they are online.

Figure 5:
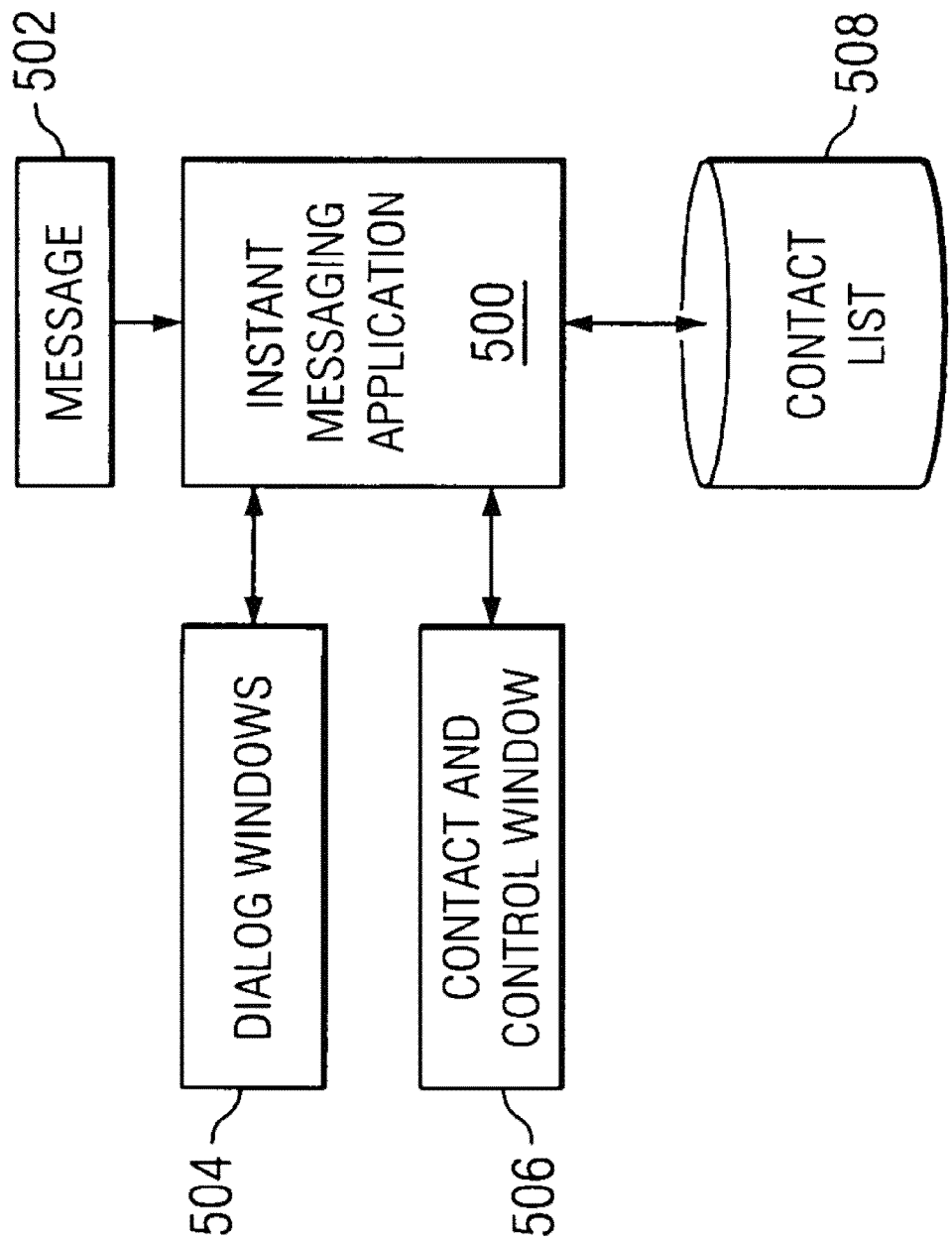
FIG. 5 is a block diagram illustrating an instant messaging client in accordance with an embodiment of the present invention.

With reference now to FIG. 5, a diagram illustrating an instant messaging client is depicted in accordance with an embodiment of the present invention. The components illustrated in FIG. 5 may be found in an instant messaging client, such as instant messaging client 401, 402, or 403 in FIG. 4. These components may be implemented in a data processing system, such as data processing system 300 in FIG. 3.

In the illustrative example, instant messaging application 500 processes messages, such as message 502, received from users located on remote data processing systems. As messages are received, these messages are presented in dialog windows 504. Additionally, dialog windows 504 provide an interface for a user to input text to send messages to other users.

Contact and control window 506 is presented by instant messaging application 500 to provide the user with a list of user names, as well as other information. Contact and control window 506 also provides an interface to allow a user to set different preferences. For example, the user may set passwords required to access different names used in instant messaging sessions.

Also, a user may employ contact and control window 506 to set other preferences, such as colors and fonts used in instant messaging application 500. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 506 is stored in contact list 508 in these examples. Additional user or screen names may be added to or deleted from contact list 508. This contact list is employed in presenting the list of names within contact and control window 506.

Figure 6:
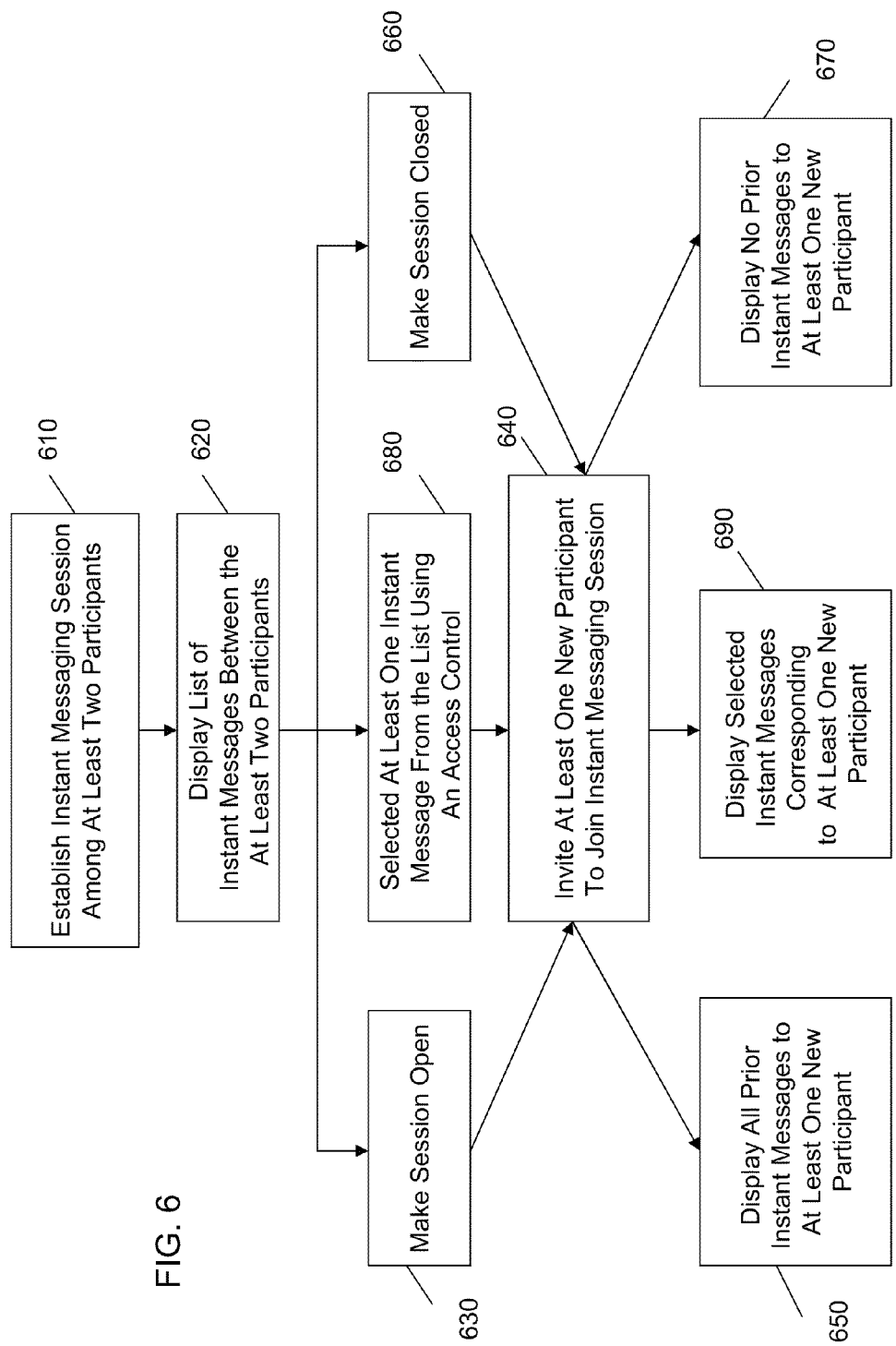
FIG. 6 is a flowchart of a process for managing instant messages in accordance with an embodiment of the present invention.

With reference now to FIG. 6, a method for allowing selective display of past instant messages includes establishing an instant messaging session among at least two participants, 610, in a graphical user interface. It will be understood that there may be any number or plurality of participants exchanging instant messages in the instant messaging session. Each participant has an associated computer system, and all of the associated computing systems are in communication across a network, for example, as illustrated in FIG. 1. A list of instant messages is displayed between the at least two participants, 620, on monitors associated with the computing systems, for example in the graphical user interface.

A participant in an existing instant messaging system may make the instant message session "open", 630. At least one new participant is invited to join the instant messaging session, 640. After joining the instant messaging session, the at least one new participant is able to see all of the past or prior instant messages exchanged between the at least two participants, 650 (i.e., all the conversation that happened since beginning of that instant messaging session).

A participant in an existing instant messaging system may make the session "closed", 660. At least one new participant is invited to join the instant messaging session, 640. After joining the instant messaging session, the at least one new participant is prevented from seeing any of the past or prior instant messages exchanged between the at least two participants, 670. Thus, the at least one new participant joining the same instant messaging session will not be able to see any of the conversation that has already happened, but will be able to see conversation from the time of their entry into the instant messaging session going forward. In a specific embodiment, marking an instant messaging session open 630 or closed 660 may be done via an "all/none" toggle displayed in the graphical user interface.

According to the present invention, a participant in an existing instant messaging system may select at least one instant message from the list of instant messages using an access control, 680. At least one new participant is invited to join the instant messaging session, 640. If the selected at least one message corresponds to the at least one new participant, the selected at least one message will be displayed when he or she joins the instant messaging session, 690. No new thread, new sub-session, or new window is started.

Only a selected at least one instant message that corresponds to the at least one new participant will be displayed. Instant messages that do not correspond to the at least one new participant (e.g., non-selected instant messages from the list) are not displayed to the at least one new participant and thus are hidden from the at least one new participant. Thus, using an access control, at least one participant in an existing instant messaging session may specify whether at least part of a past conversation or chat history between participants in the instant messaging session should be kept private or should be shared when at least one new participant joins the same instant messaging session.

In specific embodiments, the at least one new participant may be invited to join the instant messaging session, 640, for example, via an invitation which may be communicated by e-mail or text message. Alternatively, the at least one new participant may be invited to join the instant messaging session via selection from a contact or buddy list within the instant messaging application, 705 as shown in FIG. 7.

Figure 7:
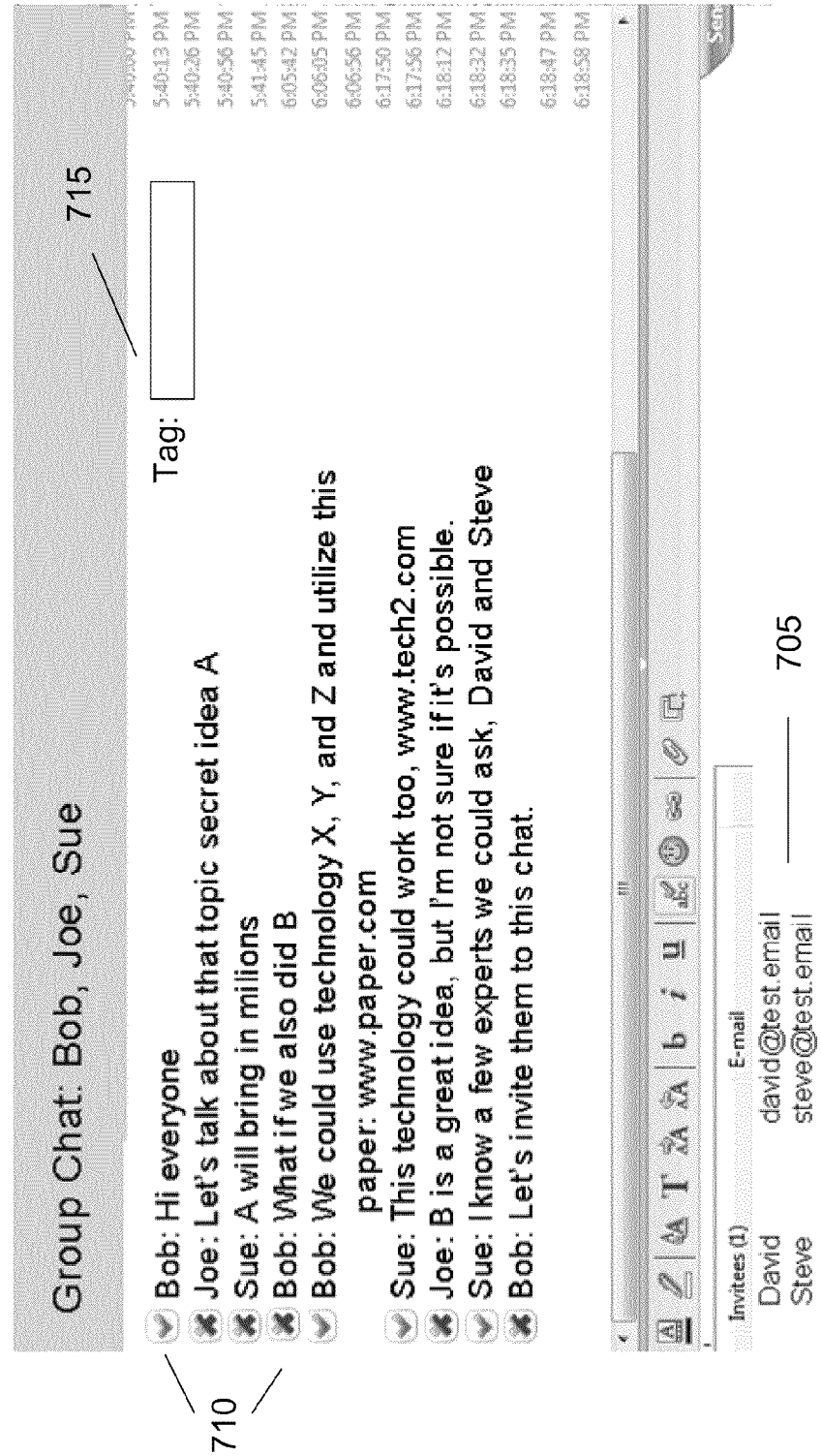
FIG. 7 illustrates an example of an instant messaging window in accordance with an embodiment of the present invention.

With reference now to FIG. 7, the access control may be a selection identifier such as a box 710 located next to each instant message in an instant messaging session. In a specific embodiment, instant messages manually selected, for example with a check, will be shared with the at least one new participant when he or she joins the instant messaging session. Instant messages manually non-selected, for example marked with an "X", will not be shared with the at least one new participant when he or she joins the instant messaging session, and therefore will remain hidden. Thus, the access control, e.g. box 710, acts as an on/off toggle for allowing viewing of the specific instant messages. The access control is not limited to a box, but may be any selection identifier that indicates which instant messages are to be shared and which are to be kept private (e.g., a radio button). In specific embodiments, the selection identifier may include a color code, for example, green for past instant messages to be shared with at least one new participant and red for past instant messages to be blocked from at least one new participant. In another specific embodiment, non-selected instant messages are by default not shared with the at least one new participant and do not need to be manually deselected.

The selection of past instant messages to be displayed is not limited to a new participant joining an existing instant messaging session. At any time during an existing instant messaging session, a participant may decide to show or hide his or her instant messages to current participants using an access control. Thus, a participant may select specific users to which his or her instant messages will be shown or hidden. For example, a checkbox may appear next to each participant, or each participant may otherwise be highlighted or selected in a contact or buddy list displayed in the graphical user interface, thereby allowing an on/off toggle for instant messages per participant.

Figure 8:
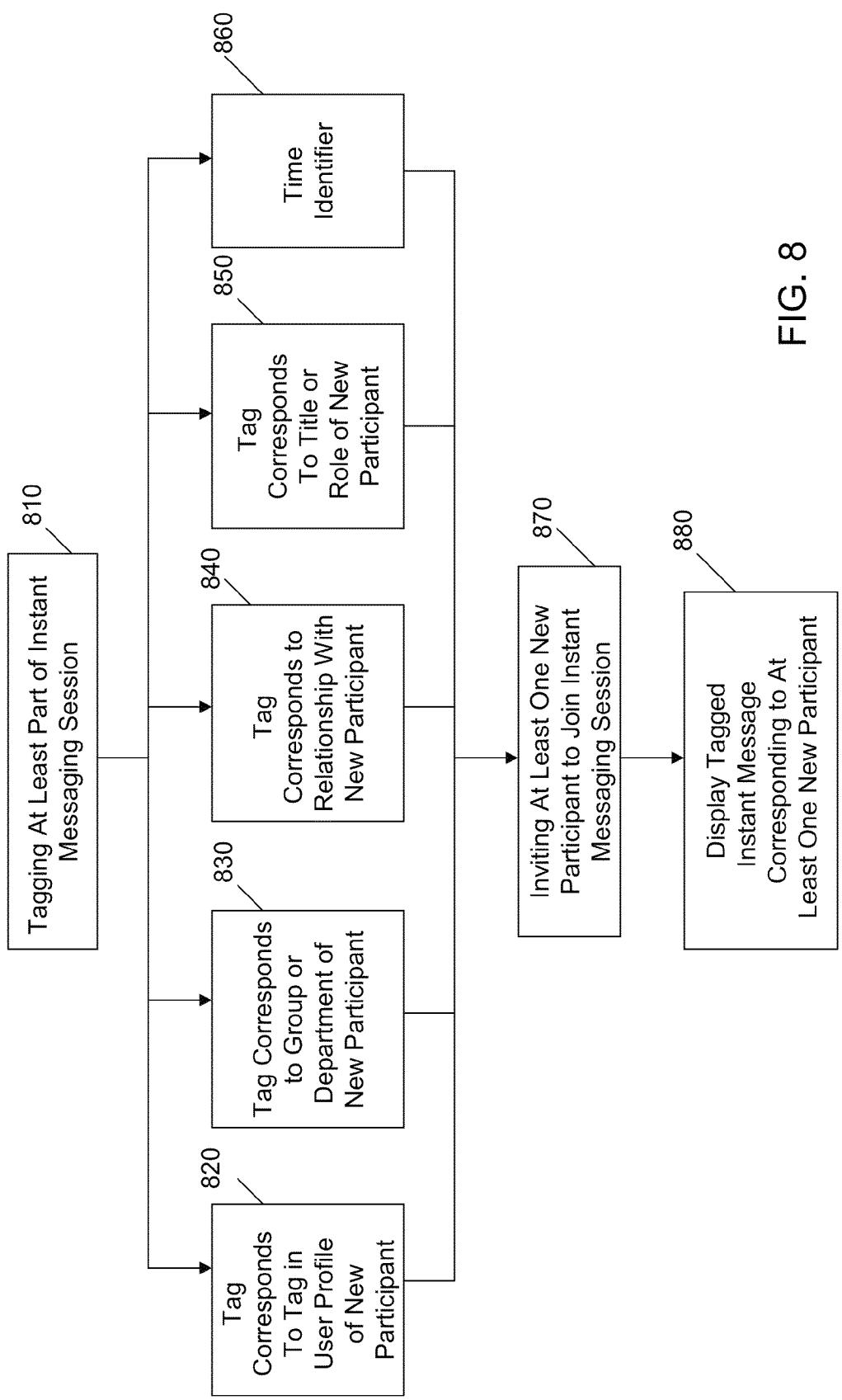
FIG. 8 is a flowchart of a process for managing instant messages in accordance with an embodiment of the present invention.

With reference now to FIG. 8, the access control for selecting which at least one new participant may view past instant messages may be done by tagging at least part of the instant messaging conversation or history 810, thereby configuring which instant messages will be displayed or will remain hidden. It will be understood that any part of an instant messaging session, for example one instant message (tag field 715 in FIG. 7) or a plurality of instant messages, may be tagged with at least one tag. A tag is a keyword or term associated with or assigned to a piece of information, thus describing the item and, in embodiments, enabling at least one of keyword-based classification, search, or sharing of information. Tagging of at least part of the instant messaging session may be done separately from or in combination with use of the selection identifier.

A tagged part of the instant messaging conversation may correspond to at least one new participant who is invited to the instant messaging session. The tag may correspond to a tag in at least one new participant's profile, 820. For example, at least one new participant has a user profile containing a tag "technology", which may be related to the user's area of interest. A participant in an existing instant messaging session tags at least one instant message with the tag "technology", 810. When the at least one new participant is invited to join the instant messaging session, 870, the tagged part of the instant messaging conversation will be displayed to the at least one new participant when he or she enters the instant messaging session, 880. Any non-tagged part of the instant messaging session that does not correspond to the at least one new participant will remain hidden. The manner of invitation may occur as discussed above.

In another specific embodiment of the present invention, a tag may correspond to a group or department (e.g., research, accounting, human resources, administration) to which the at least one new participant belongs, 830. For example, at least one new participant has a "research department" tag. If a participant in an existing instant messaging session tags at least one instant message with the tag "research department" then, after inviting the at least one new participant to join the instant messaging session 870, the tagged at least one instant message will be displayed to the at least one new participant when he or she enters the instant messaging session, 880. Any non-tagged part of the instant messaging session that does not correspond to the at least one new participant will remain hidden.

In another specific embodiment of the present invention, a tag may correspond to a social networking relationship between an existing participant and at least one new participant (e.g., co-worker, friend), 840. For example, Sue tags some instant messages with the word "friend" and other instant messages with the word "coworker". Sue invites both David and Steve to join the instant messaging session, 870. David is a friend of Sue, and Steve is her coworker. The "coworker" tagged items are displayed to Steve and the "friend" tagged items and displayed to David, 880. In specific embodiments, if the tagged content was something that was not relevant to the social networking relationship (e.g., tag "lunch plans"), Sue would be prompted whether or not Steve and/or David should be able to view the instant message with the tag "lunch plans" and that decision would be remembered for the future use.

In another specific embodiment of the present invention, a tag may correspond to a role or title of the at least one new participant 850 (e.g., manager, president, consultant). For example, the at least one new participant has a "manager" tag. A participant in an existing instant messaging session tags at least one instant message with the tag "manager". After the at least one new participant accepts an invitation to join the instant messaging session, 870, the tagged at least one instant message will be displayed to the at least one new participant when he or she enters the instant messaging session, 880. Non-tagged instant messages that do not correspond to the at least one new participant will remain hidden from the at least one new participant.

In another specific embodiment, a tag may correspond to a time identifier, 860. The time identifier includes, but is not limited to, at least one of date, day, time, month, and combinations thereof. For example, a participant in an existing instant messaging session tags at least one instant message with the date "August 10". At least one new participant has an online, computerized, or digital calendar showing that he or she is out of the office on that date. After the at least one new participant accepts an invitation to join the instant messaging session, 870, the tagged at least one instant message will remain hidden from the at least one new participant when he or she enters the instant messaging session, 880. The tagged identifier allows synching with at least one new participant's online calendar.

According to an embodiment of the present invention, a system for allowing selective display of past instant messages may include a server for establishing an instant messaging session among a plurality of participants, each participant having an associated computer system, all of the associated computing systems in communication across a network. The system may include at least one client comprising a graphical user interface for displaying a list of instant messages between the plurality of participants and an access control for allowing at least one participant to select specific instant messages from the list to be shared with at least one new participant to the instant messaging session. The server, graphical user interface, and access control may be implemented in the data processing systems illustrated in FIGS. 1-3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for allowing selective display of past instant messages, comprising:
  establishing an instant messaging session among at least two participants, each participant having an associated computer system, all of the associated computing systems in communication across a network;
  displaying a list of instant messages between the at least two participants on monitors associated with the computing systems;
  selecting at least one instant message from said list of instant messages using an access control, wherein said access control comprises a selection identifier displayed next to each instant message in said list of instant messages and indicates which messages are to be shared and which messages are to be kept private;
  inviting at least one new participant to join the instant messaging session; and
  when the selected at least one instant message corresponds to the at least one new participant, displaying the selected at least one instant message on a monitor used by the at least one new participant.

2. The method according to claim 1, comprising displaying the selected at least one instant message on a monitor used by the at least one new participant.

3. The method according to claim 1, wherein non-selected instant messages from said list are not displayed on the monitor of the at least one new participant.

4. The method according to claim 1, wherein the selection identifier has a color code.

5. The method according to claim 1, wherein said selecting the at least one instant message using an access control comprises manually selecting whether each participant views instant messages from said list of instant messages.

6. The method according to claim 1, wherein said inviting the at least one new participant comprises sending the at least one new participant an invitation via e-mail.

7. The method according to claim 1, wherein said inviting the at least one new participant comprises selecting the at least one new participant from a contact list within an instant messaging application.

8. The method according to claim 1, further comprising identifying at least one instant message with at least one tag.

9. The method according to claim 8, wherein said at least one tag corresponds to a tag listed in an at least one new participant's user profile.

10. The method according to claim 8, wherein said at least one tag corresponds to a title of the at least one new participant.

11. The method according to claim 8, wherein said at least one tag corresponds to a role of the at least one new participant.

12. The method according to claim 8, wherein said at least one tag corresponds to a group or department to which the at least one new participant belongs.

13. The method according to claim 8, wherein said at least one tag corresponds to a social networking relationship between a participant in an existing instant messaging session and the at least one new participant.

14. The method according to claim 8, wherein if said at least one tag does not correspond to the at least one new participant, the participant who tagged the at least one instant message is prompted whether the at least one new participant should view the tagged at least one instant message.

15. The method according to claim 8, wherein said at least one tag corresponds to a time identifier.

16. The method according to claim 1, wherein the selection identifier comprises a box or radio button.

17. A method for allowing selective display of past instant messages, comprising:
  establishing an instant messaging session among a plurality of participants, each participant having an associated computer system, all of the associated computing systems in communication across a network;
  displaying a list of instant messages between the plurality of participants on monitors associated with the computing systems;
  identifying at least one instant message with a tag;
  inviting at least one new participant to join the instant messaging session;
  if the tagged at least one instant message corresponds to the at least one new participant, displaying the at least one instant message having the tag on a monitor used by the at least one new participant; and
  if said at least one tag does not correspond to the at least one new participant, the participant who tagged the at least one instant message is prompted whether the at least one new participant should view the tagged at least one instant message.

18. The method according to claim 17, wherein said at least one tag corresponds to a tag listed in the at least one new participant's user profile.

19. The method according to claim 17, wherein said at least one tag corresponds to a title of the at least one new participant.

20. The method according to claim 17, wherein said at least one tag corresponds to a group or department to which the at least one new participant belongs.

21. A computer program product for allowing selective display of past instant messages, comprising:
  a non-transitory computer readable storage medium;
  first program instructions to establish an instant messaging session among a plurality of participants, each participant having an associated computer system, all of the associated computing systems in communication across a network;
  second program instructions to display a list of instant messages between the plurality of participants on monitors associated with the comprising systems;
  third program instructions to select at least one instant message from said list of instant messages using an access control, wherein said access control comprises a selection identifier displayed next to each instant message in said list of instant messages and indicates which messages are to be shared and which messages are to be kept private;
  fourth program instructions to invite at least one new participant to join the instant messaging session; and
  fifth program instructions to display the selected at least one instant message on a monitor used by at least one new participant, when the selected at least one instant message corresponds to the at least one new participant,
  wherein said first, second, third, fourth, and fifth program instructions are stored on said computer readable storage medium.

22. The computer program product according to claim 21, wherein the third program instructions further comprises identifying at least one instant message with at least one tag.

* * * * *